(No Model.) 5 Sheets—Sheet 1.

W. A. KONEMAN.
GAS MANUFACTURING APPARATUS.

No. 500,333. Patented June 27, 1893.

Witnesses: Chas. E. Gaylord, Clifford N. White.

Inventor: William A. Koneman, By Dyrenforth & Dyrenforth, Attys.

(No Model.)  5 Sheets—Sheet 5.

W. A. KONEMAN.
GAS MANUFACTURING APPARATUS.

No. 500,333.  Patented June 27, 1893.

Witnesses:
Chas. E. Gaylord
Clifford N. White

Inventor:
William A. Koneman
By Dyrenforth & Dyrenforth
Attys.

UNITED STATES PATENT OFFICE.

WILLIAM A. KONEMAN, OF CHICAGO, ILLINOIS, ASSIGNOR TO THE CHICAGO HEAT STORAGE COMPANY, OF SAME PLACE.

GAS-MANUFACTURING APPARATUS.

SPECIFICATION forming part of Letters Patent No. 500,333, dated June 27, 1893.

Application filed September 22, 1892. Serial No. 446,518. (No model.)

*To all whom it may concern:*

Be it known that I, WILLIAM A. KONEMAN, a citizen of the United States, residing at Chicago, in the county of Cook and State of Illinois, have invented a new and useful Improvement in Gas-Manufacturing Apparatus, of which the following is a specification.

The object of my invention is to provide an improved apparatus for manufacturing gas according to a process for simultaneously and continuously generating, in the same apparatus, a retort-gas and a producer or water gas by blasting a bed of bituminous coal to incandescence with air or air and steam forced through it to generate a producer or water gas and leading it off from a point below the top of the bed, the portion of which above the leading-off point of the said gas is heated by conduction from below, the passage being prevented of the blast-currents through the upper portion of the fuel, from which the gas is thus distilled by a more gradual heating of the coal and passed off at the top, the upper portion of the bed of coal being thereby coked and allowed to sink by gravity into the lower or "generating" portion of the chamber for subjection to the blast for producing the gas led off from a point below the base of the "retorting chamber," as aforesaid.

Figure 1:
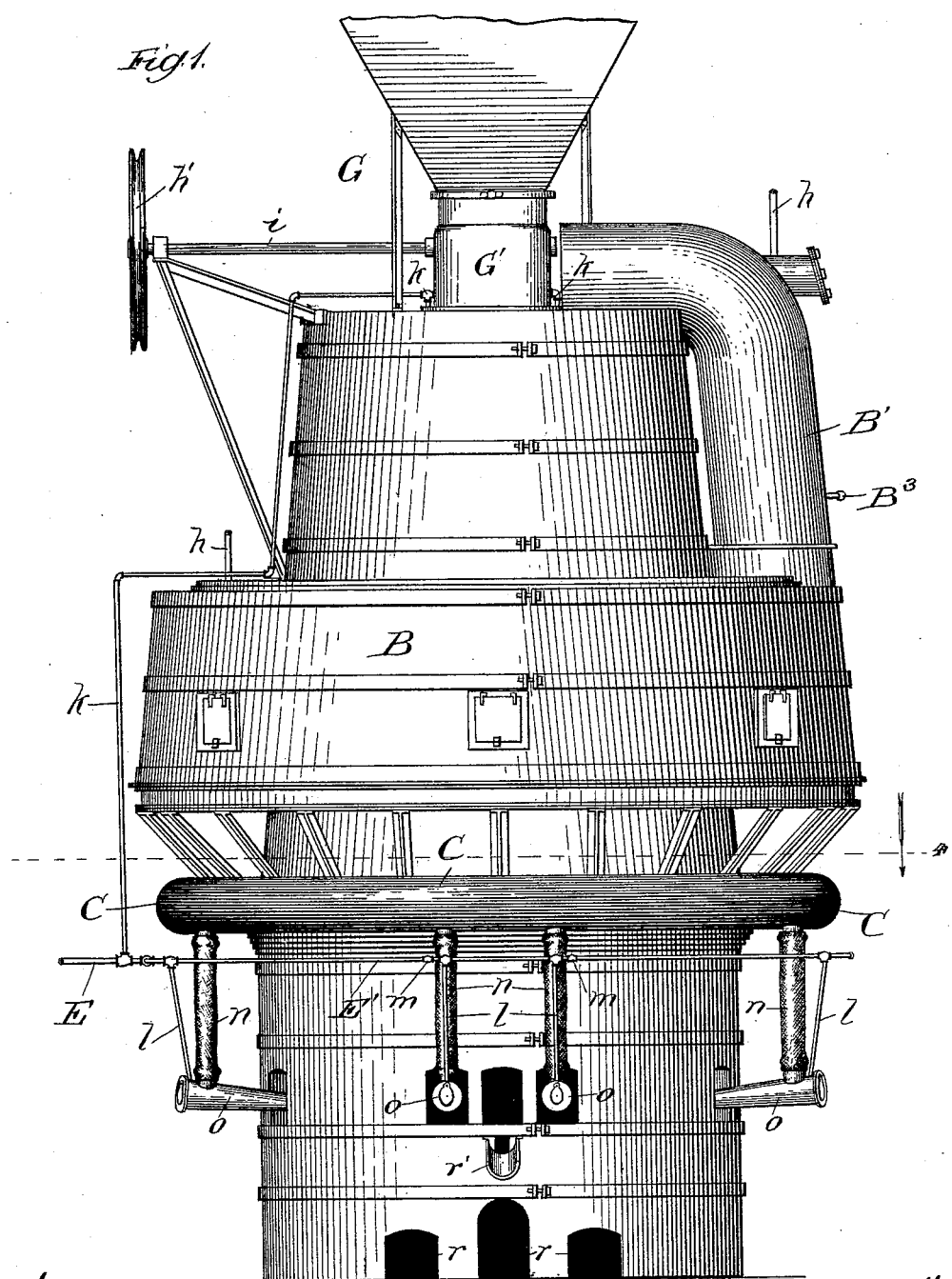
Figure 2:
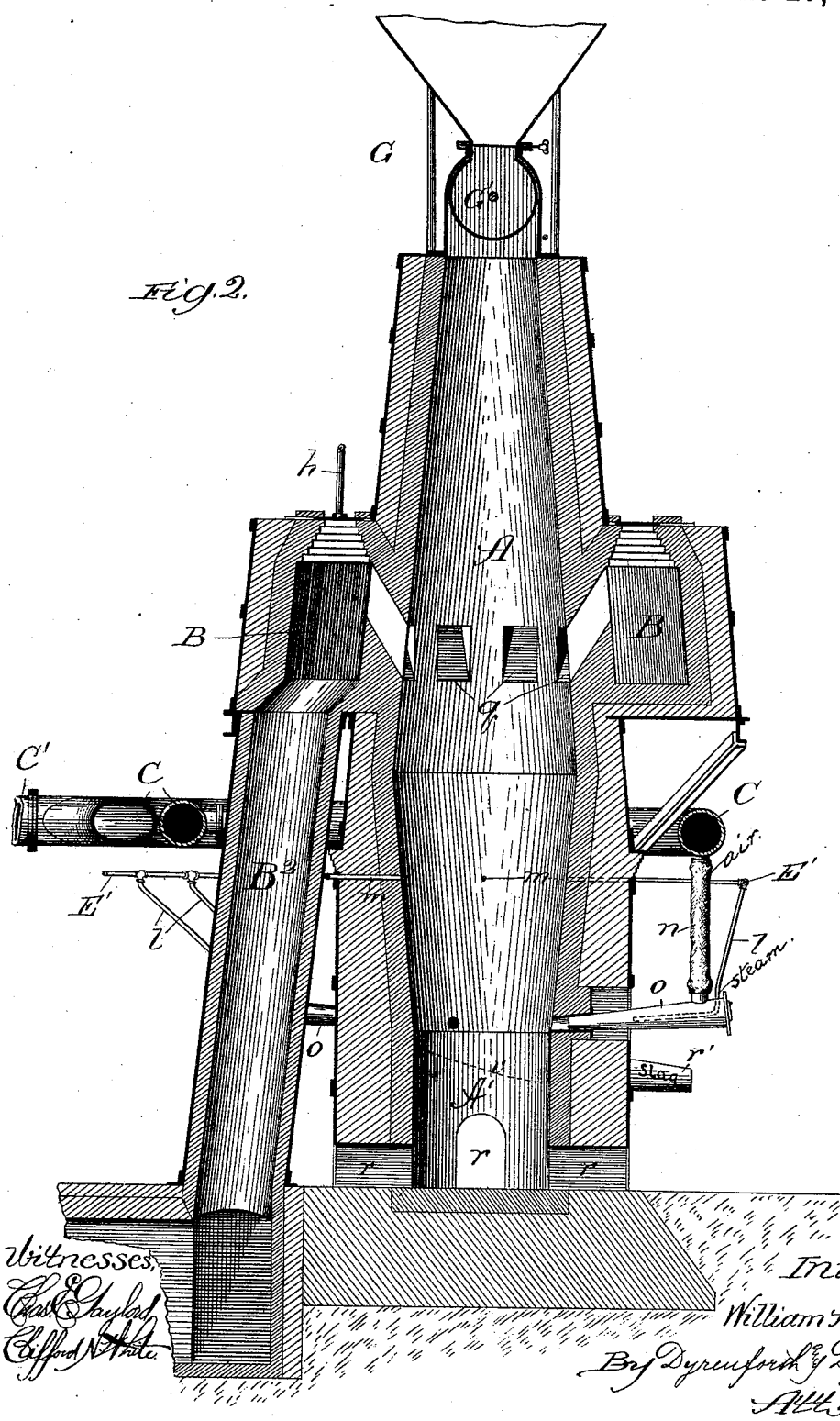
Figure 3:
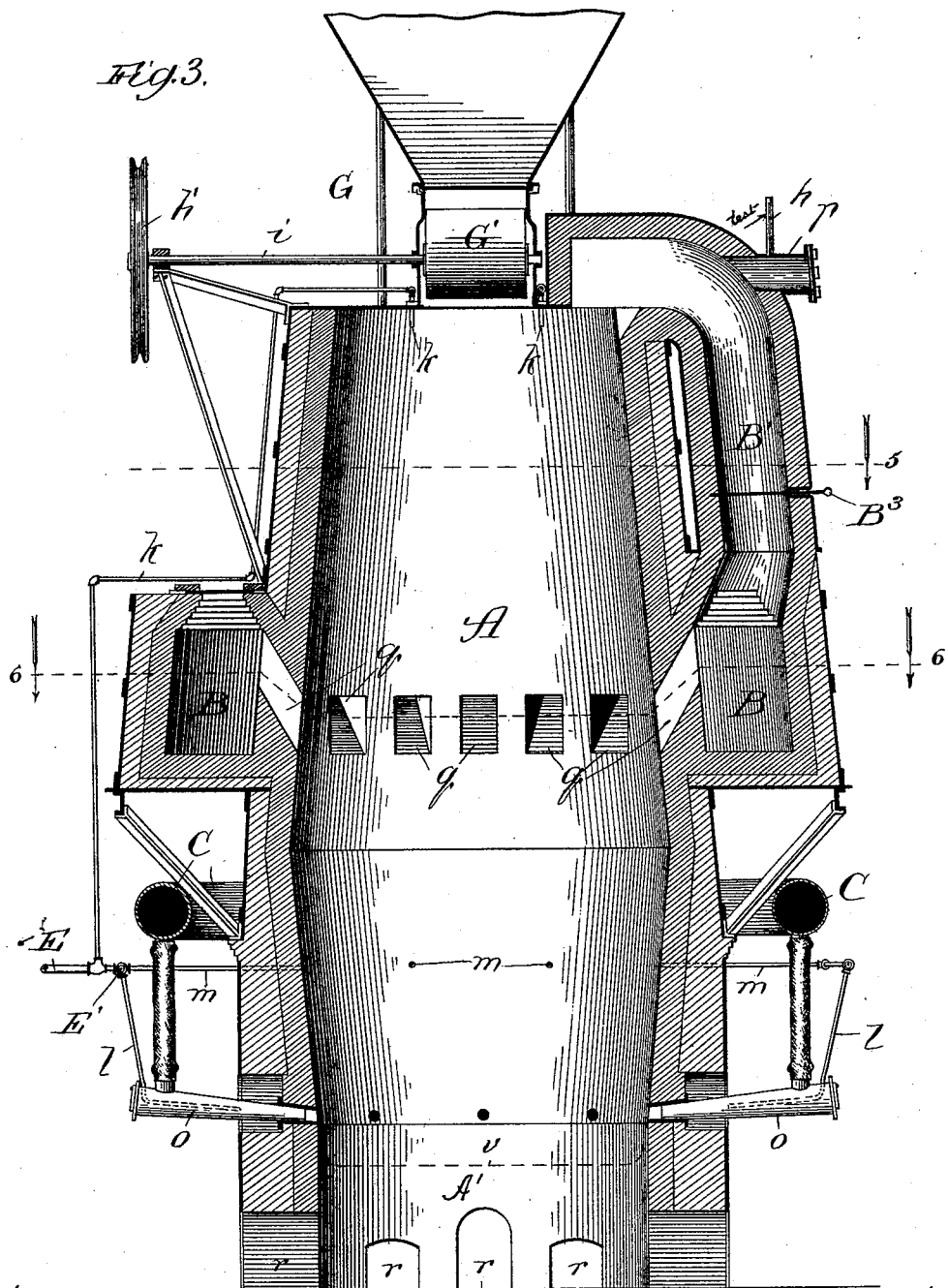
Figure 4:
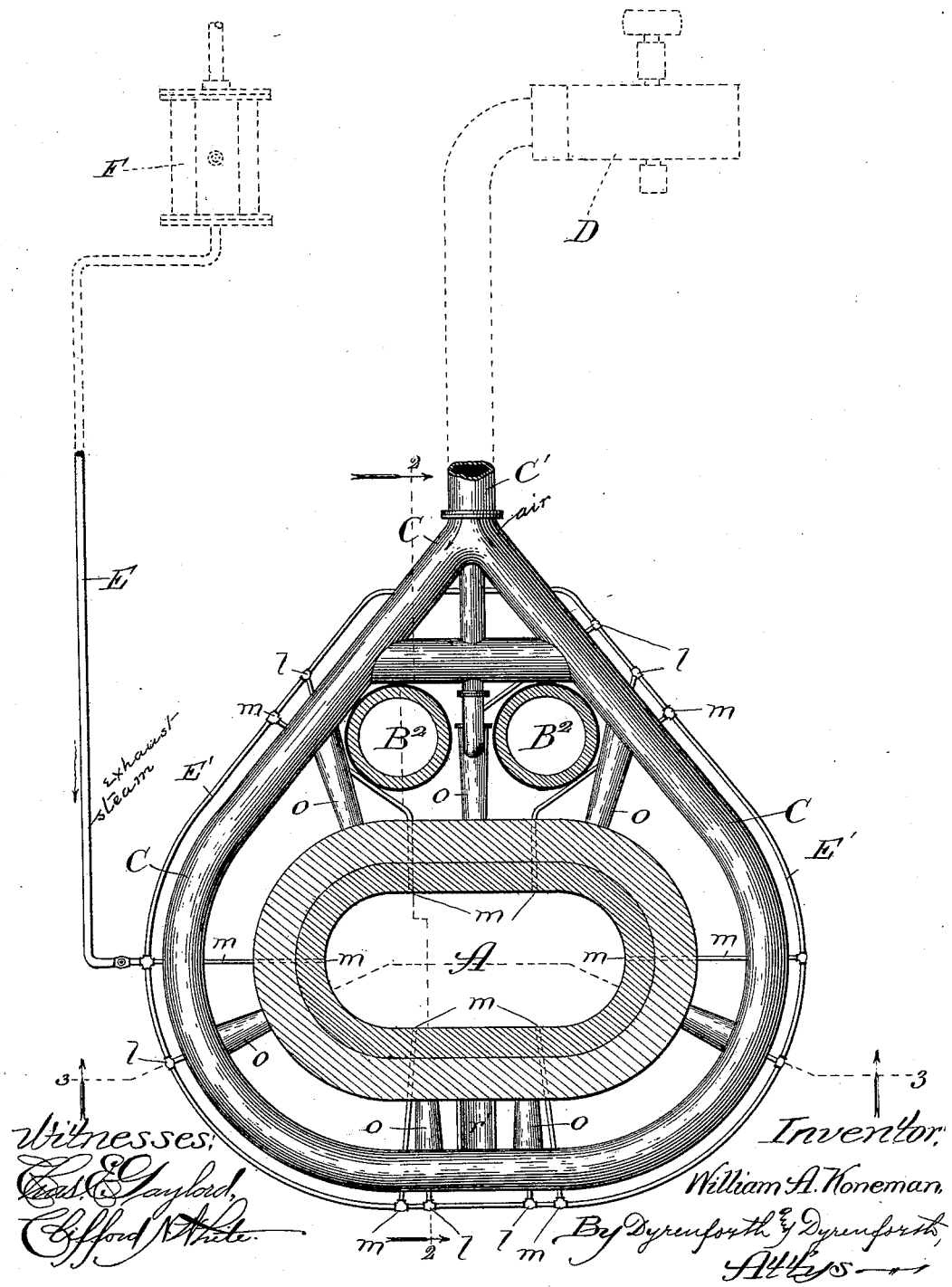
Figure 5:
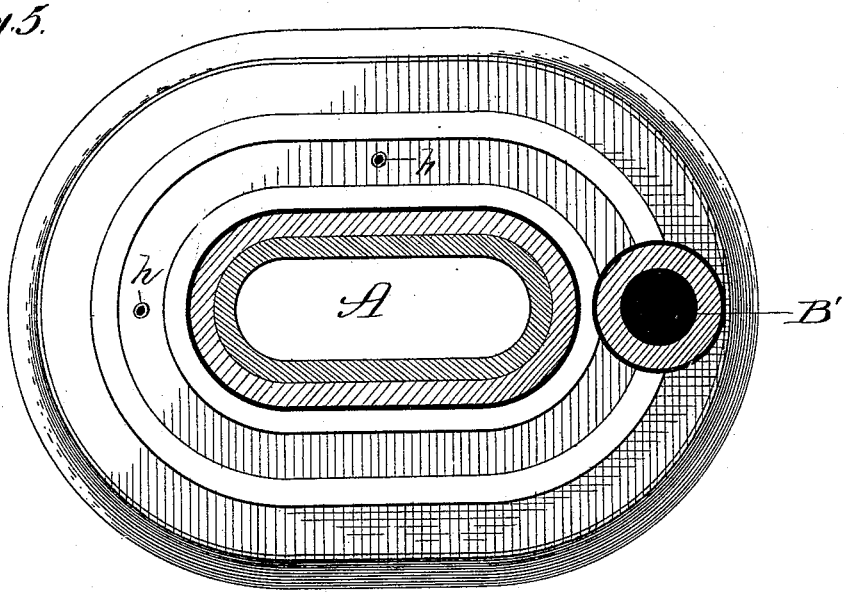
Figure 6:
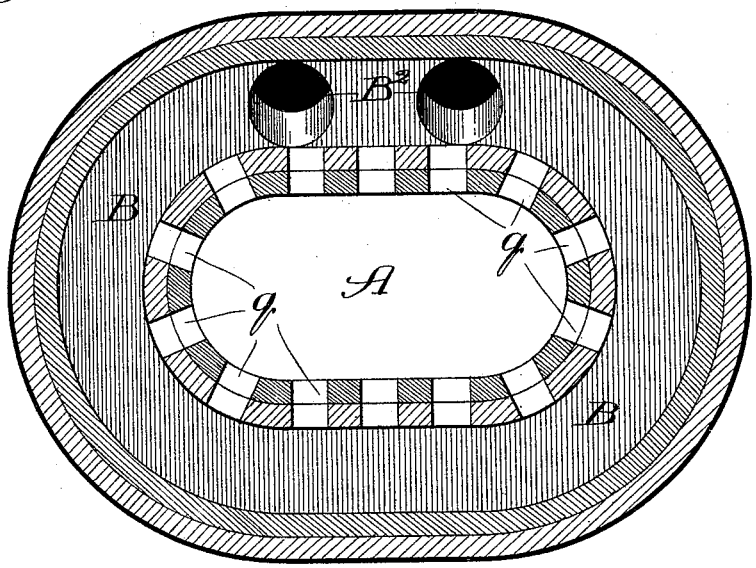

Referring to the accompanying drawings: Figure 1 shows my improved apparatus in elevation. Figs. 2 and 3 are views of the same in sectional elevation, the sections being taken, respectively, at the irregular lines 2—2 and 3—3 on Fig. 4 and regarded in the direction indicated by arrows. Fig. 4 is a plan sectional view of the apparatus, the section being taken at the line 4 on Fig. 1 and regarded as indicated by an arrow, with the steam-supply and air-blast apparatus in dotted representation. Figs. 5 and 6 are plan sections taken, respectively, at the lines 5 and 6—6 on Fig. 2 and viewed as indicated by arrows, but with all appliances external of the generator-shell removed.

The generator is represented as a fire-brick structure preferably of the general elliptical shape in cross-section illustrated and of considerable height (say thirty feet or more), as the successful practice of my improved process, hereinafter described, requires the provision of a generator-chamber A in which a high column of coal or other carbonaceous fuel may be maintained. For the successful practice of the aforesaid process the chamber is caused to taper somewhat, as represented, both upward and downward from about its transverse center, the lower taper, however, extending only to a point short of the base, from which the walls of the chamber should be straight and form a pit A' provided with doors $r$ through which to gain access to the pit for removing the contents of the same. These contents may be ashes, though I also provide a spout $r'$ for drawing off liquid slag formed with the ashes if a flux shall be fed with the coal, in which latter case the steam-supply through the tuyeres, hereinafter referred to, is shut off.

About the exterior of the chamber A above its center is formed what may be termed a gas confining and mixing chamber B, communicating through ports $q$ with the generating chamber and with which on one side at its extreme upper end the chamber B also has free communication through a rising connecting passage B', having a draw-off outlet $p$. A down-take $B^2$, preferably duplicated, as represented, extends from the under side of the chamber B at the side thereof farthest from the passage B'. An air-blast leads into the chamber A near its base through tuyeres $o$, the air being conducted thereto through branches $n$ of a conduit C encircling the generator-shell and into which leads the blast-outlet pipe C' of a fan D (Fig. 4). The steam-supply comes through the exhaust-pipe E of an engine serving to drive the fan D and of which the cylinder F is indicated in Fig. 4; and the exhaust-pipe E leads into a branch E' encircling the structure below the air-pipe C, and from it lead sub-branches $m$ into the chamber A through its walls some distance above the plane of the tuyeres and preferably also branches $l$ into the tuyeres and branches $k$ downward into the top of the generator.

The generator is surmounted by a hopper G, preferably of the automatic-feed variety and to that end provided with a rotary drum G' at its base on a shaft $i$ supported in suitable bearings and carrying at its outer end a drive-pulley $h$, whereby the drum, while permanently closing the generator to the hopper receives the charge of the latter and dumps it into the generator by turning the drum.

Following is a description of the operation of my improved apparatus: The chamber A being charged with coal and the charge, (which should be maintained to extend nearly to the top of the chamber) being blasted through the tuyeres, steam is admitted from the pipes $m$ and also, if desired, from the pipes $l$; and the hopper is actuated to deposit fresh supplies of coal, as required, on the bed in the generator-chamber. The resultant gas passes through the ports $q$ into the chamber B and thence discharges through the down-takes $B^2$, sufficient, however, rising in the passage B' to the top of the bed in the generator to exert and maintain a degree of pressure thereon against the uprising currents sufficient to prevent such intense heating of the upper portion of the bed as would tend to suddenly disintegrate the fresh-coal deposits with the result, (which I overcome,) of liberating and driving off the volatile constituents before they shall have undergone adequate subjection to heat to be thoroughly gasified. The pressure on the top of the fuel-bed of the gas so generated, by preventing the currents generated by the blast from rising through the fuel above the line of the ports $q$, causes that fuel to become heated by conduction from below, and by the sensible heat of the gas on top thereby effecting slow distillation of the fuel above the ports $q$; and the gas product of such distillation, which rises through the mass against the gas-pressure from the passage B' on the top of the bed, enters that passage as a pure, high grade illuminating gas, which mixes with the lower grade fuel gas therein and in the chamber B' and is drawn off through the down-takes $B^2$. The gas in the passage B' will be the purer illuminating gas according to the amount of volatile matter in the fuel of the upper portion of the bed and to the rapidity of distillation. A valve $B^3$ may be provided in the passage B' to regulate the flow to and pressure on the top of the fuel-bed; or to entirely close the passage as in generating the gas of upper distillation to be led off by itself. The purer, lighter gas, product of distillation which is largely of the nature of marsh-gas, may be drawn off at the passage B' through the outlet $p$, if desired, for separate use, as for purposes requiring especially high illuminating and heating gas, provision in the form of test-tubes $h$ being made for drawing off the upper gas from the chamber B for examination; and the mixture of the different grades of the generated gases which at all times takes place in the chamber B affords a fuel gas of very good quality.

The downward and upward flaring construction of the chamber A is advantageous in maintaining the mass of the bed, which tends to shrink by the consumption, compact in the lower tapering portion, whereby it is crowded against the walls and thus prevents the currents generated by the air-blast from passing up mainly along the walls and forces their more uniform distribution through the entire mass of the bed. The downward flare of the upper portion, on the other hand, is afforded to provide greater area for the fuel in its descent to accommodate its expansion during the coking action and, especially, to afford a passage to the lower, or generating, portion of the chamber A at least as great in horizontal area as the coke-receiving upper end of such generating portion of the chamber, whereby the coke may freely feed into it by gravity from the retort-chamber.

By employing for the steam-supply to the generator the exhaust from the engine which drives the fan D, the advantage is attained of automatic regulation of the proportionate supply of air and steam, since by lowering or raising the speed of the fan, the amount of the steam-exhaust is accordingly diminished or increased. Furthermore an advantage incidental to the impediment to the generation of violent uprising currents, is that there is no, or at least very much the less, carriage by the currents of fine particles of coal or soot into the resultant gas, which is thereby the more readily fixed and the purer.

The grateless pit A', with the doors $r$ is a feature of advantage, since it permits the removal of any ashes at the base of the fire to be accomplished without injury to the condition of the bed. When the fuel is fluxed, however, as hereinbefore mentioned, a bottom may be formed in the pit, of ashes or other material, extending up to the line $v$, which is near the plane of the spout $r'$.

What I claim as new, and desire to secure by Letters Patent, is—

1. In a gas-manufacturing apparatus, the combination of the shell containing a lower generating chamber and an upper retorting chamber, a circumferential chamber B surrounding the shell externally thereof, ports $q$ affording communication between the said generating chamber and circumferential chamber, a passage B' connecting the chamber B with the upper end of the retorting-chamber, blasting means for the lower generating chamber and an outlet for the gas from the said circumferential chamber, substantially as described.

2. In a gas-manufacturing apparatus, the combination of the shell containing an ash-pit A' in its base provided with cleaning-openings $r$, a lower generating chamber above the ash-pit and having unobstructed communication therewith for the free passage of ashes, and an upper retorting chamber, a circumferential chamber B surrounding the shell externally, ports $q$ affording communication between the said generating chamber and circumferential chamber, a passage B' connecting the chamber B with the upper end of the retorting chamber, blasting means for the lower generating chamber and an outlet for the gas from the said circumferential chamber, substantially as described.

WILLIAM A. KONEMAN.

In presence of—
  M. J. FROST,
  W. N. WILLIAMS.